(12) United States Patent
Chan et al.

(10) Patent No.: US 11,801,945 B2
(45) Date of Patent: Oct. 31, 2023

(54) HELICOPTER TUG APPARATUS

(71) Applicants: Anthony Chan, Sierra Madre, CA (US); Tracy Haeggstrom, Orange, CA (US)

(72) Inventors: Anthony Chan, Sierra Madre, CA (US); Tracy Haeggstrom, Orange, CA (US)

( * ) Notice: Subject to any disclaimer, the term of this patent is extended or adjusted under 35 U.S.C. 154(b) by 350 days.

(21) Appl. No.: 17/368,839

(22) Filed: Jul. 7, 2021

(65) Prior Publication Data

US 2023/0008328 A1 Jan. 12, 2023

(51) Int. Cl.
*B64F 1/22* (2006.01)

(52) U.S. Cl.
CPC .................................. *B64F 1/228* (2013.01)

(58) Field of Classification Search
CPC .... B60P 3/11; B64F 1/22; B64F 1/228; B64F 1/227; B64F 1/007
See application file for complete search history.

(56) References Cited

U.S. PATENT DOCUMENTS

| | | | |
|---|---|---|---|
| 3,279,722 A * | 10/1966 | Glover, Jr. | B64F 1/22 244/50 |
| 3,761,040 A * | 9/1973 | Cummins | B64F 1/36 180/9.1 |
| 2014/0209733 A1* | 7/2014 | Chan | B64F 1/227 244/50 |
| 2019/0135451 A1* | 5/2019 | Coccaro | B60P 3/11 |

\* cited by examiner

*Primary Examiner* — Richard G Davis
(74) *Attorney, Agent, or Firm* — Edwin Tarver

(57) ABSTRACT

A helicopter tug apparatus for loading, transporting, and unloading a helicopter landing skid includes a plurality of landing skid loading units. The loading units are arranged to support the landing skid, and each of the loading units includes a skid cradle with a plurality of tug rollers configured to engage the landing skid. The loading units each include a drive track, and at least one motor for operating the skid cradle and the drive track. The rollers are reverse synchronized with the drive track, such that when the drive track moves the loading unit under the landing skid, the tug rollers turn in reverse to avoid placing lateral force on the landing skid.

20 Claims, 6 Drawing Sheets

HELICOPTER TUG APPARATUS

BACKGROUND

The present apparatus relates generally to aircraft transport. More specifically, the present apparatus relates to a tug for securing and transporting a helicopter while on the ground.

Helicopter ground transport apparatus, such as helicopter tugs, are known in the art. Currently known helicopter tugs typically comprise a low profile motorized wheeled vehicle capable of supporting a helicopter skid, and movable under its own power. Several problems exist in the art related to helicopter tugs as currently configured. Loading and unloading functions are typically manually operated, even though movement of the tug is motorized. Additionally, helicopter tugs may have a steering functionality, but are incapable of making tight turns or rotating in place. Current helicopter tugs are also incapable of supporting a wide range of helicopter skid sizes, and frequently must include additional features for supporting differently sized aircraft.

Hence, what is needed is a helicopter tug apparatus that provides automated operation, maneuverability, and versatility without the limitations of existing helicopter tug apparatus.

SUMMARY

A helicopter tug apparatus for loading, transporting, and unloading a helicopter having a landing skid is shown and described. The helicopter tug includes a plurality of landing skid loading units. The loading units are arranged to support the landing skid, and each of the plurality of loading units includes a skid cradle with a plurality of tug rollers configured to engage the landing skid. The loading units also each include a drive track, and at least one motor for operating the skid cradle and the drive track The rollers are reverse synchronized with the drive track, such that when the drive track moves the loading unit under the landing skid, the tug rollers turn in reverse to avoid placing lateral force on the landing skid. Thus, the tug rollers mimic the stationary nature of the surface on which the landing skid rests, preventing it from being pushed laterally by the loading unit. The skid cradle on each loading unit also includes a pivot. The pivot is configured such that the tug rollers are slanted to engage the landing skid at ground level (i.e., the skid cradle tips downward where it meets the landing skid).

The tug rollers are preferably characterized by non-slip outer surfaces in order to securely initially engage the landing skid, in addition to preventing it from sliding relative to the loading unit during transport. The tug rollers are also preferably configured along a horizontal plane in the skid cradle to simultaneously provide multiple points of contact with the landing skid during loading, transport, and unloading of the helicopter.

In one implementation, at least two of the loading units are connected by adjustable separation bars to accommodate a variety of widths of landing skids. The loading units also preferably include alignment rollers, oriented along a vertical axis, to confine the landing skid over the tug rollers and prevent the landing skid from moving off of the skid cradle. To accommodate the substantial weight of a helicopter, each of the loading units also preferably comprises fixed wheels adjacent the skid cradle, opposite the drive track, the fixed wheels rotating along the same axis as the drive track.

The helicopter tug also includes a slip clutch between the drive track and the tug rollers. The slip clutch is configured to alleviate torsional pressure along the drive train occurring between drive track and tug rollers due to unequal rotation between them. A roller engagement clutch is also provided for governing loading/unloading, and transport operations. The roller engagement clutch is switchable between a loading/unloading mode, in which the tug rollers are allowed to rotate for loading and unloading, and a locked mode for transportation, in which the tug rollers are prevented from rotating. Preferably, the roller engagement clutch is operated by a remote controlled servo motor.

In one alternative implementation, the helicopter tug may be characterized as having two loading units connected by a first separation bar such that the landing skid may rest on both loading units. Two caster units are provided, separated from the loading units by caster connection bars. The caster units are connected by a second separation bar. Both the first separation bar and the second separation bar are preferably adjustable. Each of the loading units includes a skid cradle having a plurality of tug rollers configured to engage the landing skid, a drive track, and at least one motor for operating the skid cradle and the drive track. Like the first implementation, the rollers are reverse synchronized with the drive track, such that when the drive track moves the loading unit under the landing skid, the tug rollers turn in reverse to avoid placing lateral force on the landing skid.

Figure 1:
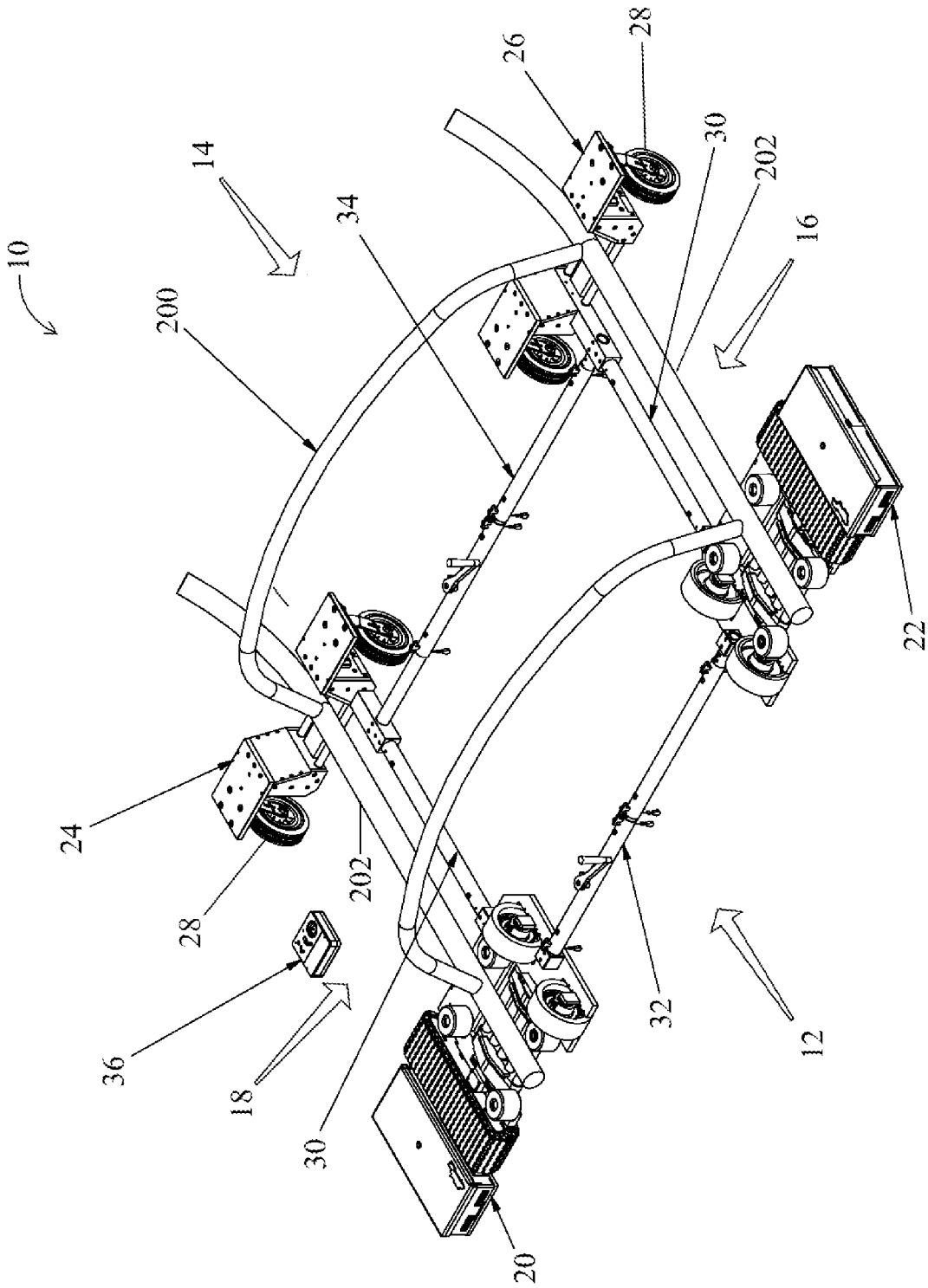
FIG. 1 illustrates a perspective view of an exemplary implementation helicopter tug apparatus with helicopter landing skids installed thereon.

REFERENCE NUMBERS 10. helicopter tug apparatus
12. front end
14. back end
16. left side
18. right side
20. right loading unit
22. left loading unit
24. right caster
26. left caster
28 caster wheels
30. caster connection bars
32. front separation bar
34. back separation bar
36. remote control radio unit
38. tug rollers
39. main plate
40. fixed wheels
42. skid cradle 44. axle
46. segmented drive track
48. electrical enclosure
50. gear train
52. skid alignment rollers
54. drive housing
56. idle housing
58. first pivot mount
60. second pivot mount
62. center pivot
64. cradle roller reduction gear
66. main motor/gearbox assembly
68. motors
70. reduction gearbox
72. segmented track driveshaft
74. sprockets
76. cradle drive gearbox
78. cradle slip clutch
80. roller engagement clutch
82. cradle drive gear train
84. first slip clutch couple
86. second slip clutch couple
88. angled teeth
90. slip clutch spring
92. roller power couple
94. drive side roller engagement couple
96. switching servo motor
97. switching linkage
98. brake side roller engagement
100. clutch output shaft
101. cradle roller drive shaft
102. brake side roller engagement couple
104. brake couple
106. batteries
108. electronic boards
109. remote control receiver
200. helicopter skid
202. landing rails
204. upturned front portions

DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Referring to FIG. 1, a helicopter tug 10 is shown for holding and transporting a helicopter (not shown) when not in flight, represented herein for purposes of illustration by a helicopter skid 200. The helicopter tug 10 is shown holding the helicopter skid 200 in a loaded position for transport. The helicopter tug 10 has a front end 12, a back end 14, as well as a left side 16 and a right side 18. These non-structural features are referred to herein strictly for purposes of describing operation of the helicopter tug apparatus 10 and should not be considered structurally limiting.

A right loading unit 20 and a left loading unit 22 are provided for the helicopter tug 10 in order to load, transport, and unload the helicopter skid 200. When both the right loading unit 20 and the left loading unit 22 are moving in the same direction at the same velocity, the helicopter tug apparatus will travel in a straight line. By altering the speed or direction of the right loading unit 20 and/or the left loading unit 22, the helicopter tug 10 may be steered in any direction, or made to turn about an axis (i.e., rotate in place), in order to load, transport, and unload the helicopter skid 200.

In the illustrated exemplary implementation, the right loading unit 20 and the left loading unit 22 are "mirror images" of each other for accommodating the two landing rails 202 of the helicopter skid 200, but are otherwise structurally and functionally identical. It should be understood that other implementations may contemplate variations between the right loading unit 20 and the left loading unit 22. A right caster 24 and a left caster 26 are also provided in order to supporting the helicopter skid 200. The right caster 24 and the left caster 26 have 360-degree rotating caster wheels 28, enabling them to rotate freely while the helicopter tug 10 is maneuvered into position for loading, transporting, and unloading the helicopter skid 200.

A set of caster connection bars 30 are disposed between the right loading unit 20 and right caster 24, and the left loading unit 22 and left caster 26. The caster connection bars 30 space the right loading unit 20 and left loading unit 24 apart from the right caster 24 and left caster 26, respectively, in order to fully support the helicopter skid 200 above the ground. The caster connection bars 30 may be of any preferred length, and in some implementations may be adjustable An adjustable front separation bar 32 is disposed between the right loading unit 20 and the left loading unit 22. Similarly, an adjustable back separation bar 34 is disposed between the right caster 24 and the left caster 26. The front separation bar 32 and the back separation bar 34 are adjustable in order for the helicopter tug 10 to accommodate a variety of differently sized helicopter skids 200, in which case the landing rails 202 may be of varying widths apart.

In some implementations, the helicopter tug 10 may be remotely operated, in which case a remote control radio unit 36 may be provided, having operational controls for steering the helicopter tug 10 forward, backward, and turning, including rotating in place when loading, transporting, and unloading the helicopter skid 200.

Figure 2:
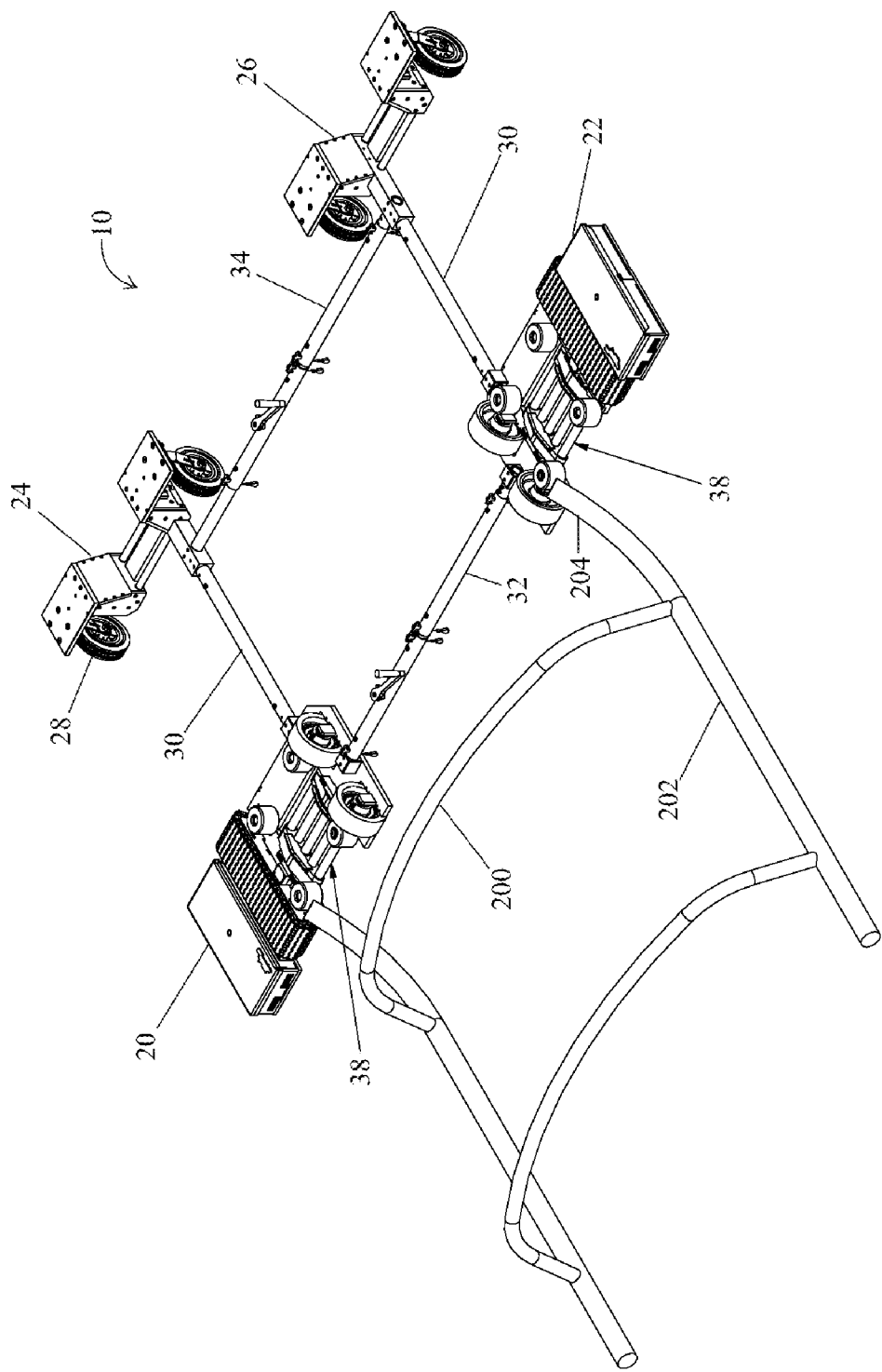
FIG. 2 illustrates a perspective view of the exemplary implementation helicopter tug apparatus with helicopter skids in position for being installed thereon.

Referring to FIG. 2, the helicopter tug 10 is shown with the helicopter skid 200 in an unloaded position. These are the relative positions of the helicopter tug 10 and helicopter skid 200 either just before loading or just after unloading, with the right loading unit 20 and the left loading unit 22 in proximity to, and oriented toward the upturned front portions 204 of the landing rails 202. The right loading unit 20 and the left loading unit 22 each comprise tug rollers 38 for engaging the landing rails 202 of the helicopter skid 200, discussed in more detail below.

To load the helicopter skid 200 on the helicopter tug 10, an operator would use the remote control to maneuver the helicopter tug 10 into the illustrated position. The right loading unit 20 and the left loading unit 22 would be in a "load ready" state by, for example, switching a load toggle switch (not shown) on the remote control radio unit 36. To a "load" position. In the load ready state, the tug rollers 38 are configured for a forward and backward movement reverse synchronized with the helicopter tug. By reverse synchronization of the tug rollers 38, the right loading unit 20 and the left loading unit 22 can drive under the helicopter skid 200 without it moving. Once the helicopter skid 200 is loaded on the helicopter tug 10, the operator may switch the load toggle switch to a "lock" position to prevent the tug rollers 38 from turning, thereby preventing the helicopter skid 200 from moving while onboard the helicopter tug 10 during transport and maneuvering.

Figure 3:
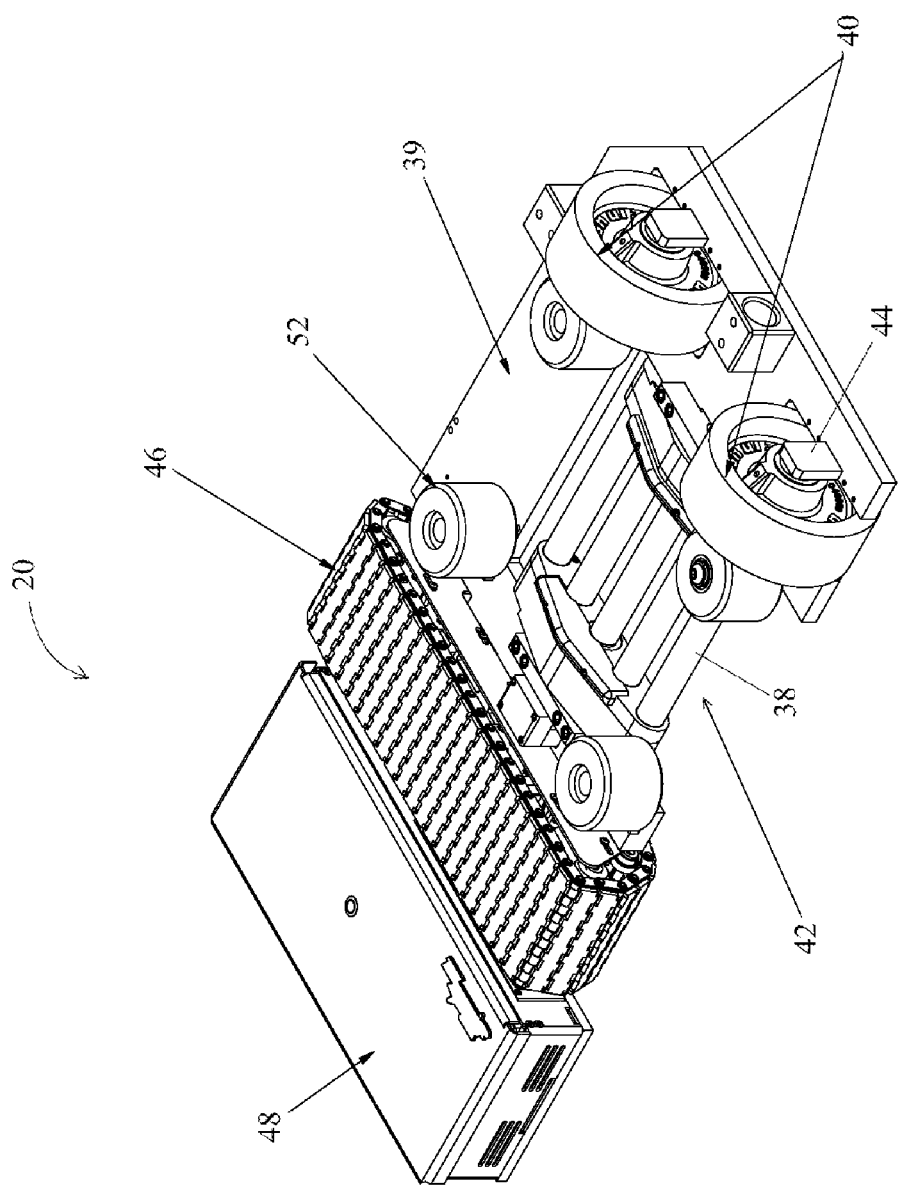
FIG. 3 illustrates a perspective view of an exemplary implementation right loading unit of the helicopter tug apparatus.

Referring to FIG. 3, the right loading unit 20 is shown. It should be understood, that while the left loading unit 22 (FIGS. 1 and 2) is a mirror image of the right loading unit 20, they are preferably substantially similar in construction and in the components comprising them. Due to the similarity in structure and function, only the right loading unit 20 is described herein, but it should be understood that these descriptions apply to the left loading unit 22 as well.

Figure 5:
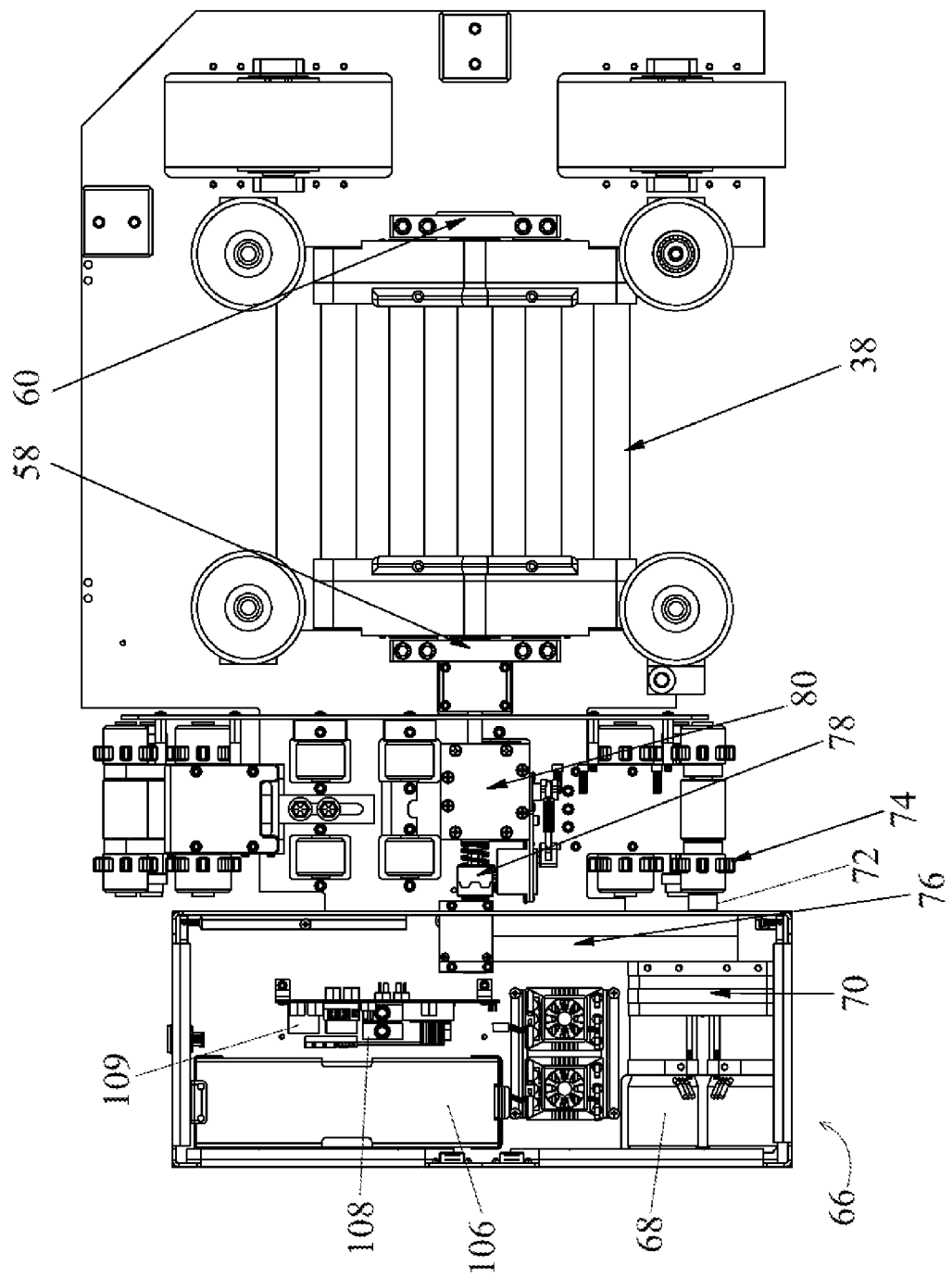
FIG. 5 illustrates a cut-away plan view of the right loading unit of the helicopter tug apparatus.

The right loading unit 20 has a main plate 39 that acts as a mount for holding all components of the right loading unit 20 together. A pair of fixed wheels 40 are located on one side of a skid cradle 42 bearing the tug rollers 38, which preferably have non-slip surfaces, to assist in supporting the weight of the helicopter skid 100 when installed on the helicopter tug 10 (FIG. 1). In the illustrated implementation, the fixed wheels 40 are not powered and are configured to spin freely on their axles 44. On the other side of the skid cradle 42 is a segmented drive track 46 responsible for powered movement of the right loading unit 20 for moving the helicopter skid 200, and which also assists in supporting the weight of the helicopter skid 200. Next to the segmented drive track 46 is an electrical enclosure 48. The electrical enclosure 48 contains the drive motors 68, batteries 106, electronic boards 108 and remote control receiver 109 as illustrated in FIG. 5. As discussed the left loading unit 22 (FIGS. 1, 2) has substantially similar features.

The skid cradle 42 lies between the fixed wheels 40 and the segmented drive track 46 and receives one of the landing rails 202 of the helicopter skid 200. As discussed, the skid cradle 42 includes a series of non-slip tug rollers 38 connected to a gear train 50 (FIG. 4) configured to move the tug rollers 38 in the same direction, and at the same rate. The skid cradle 42 can also pivot along an axis parallel to the tug rollers 38, enabling the skid cradle to angle downward when loading the helicopter skid 200, and then transition to a flat configuration when the helicopter skid 200 is fully loaded. In order to center the helicopter skid 200 on the skid cradle 42, and keep it centered on the skid cradle 42, the right loading unit 20 (similar to the left loading unit 22) includes four skid alignment rollers 52 (two on each side of the skid cradle 42).

Figure 4:
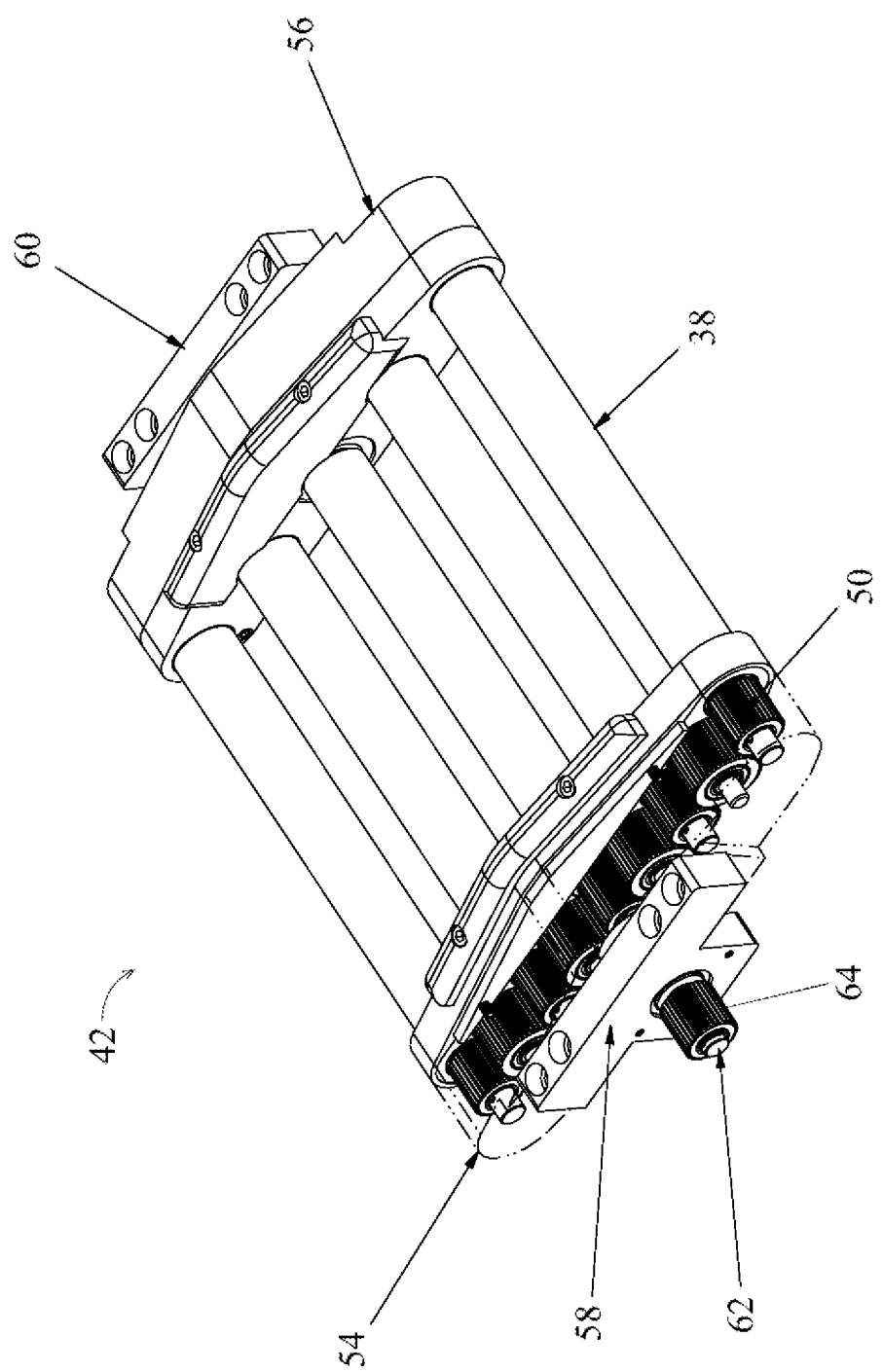
FIG. 4 illustrates a perspective view of a skid cradle unit of a loading unit of the helicopter tug apparatus.

Referring to FIG. 4, the skid cradle 42 is shown. The skid cradle 42 comprises a drive housing 54 and the idle housing 56. The non-slip tug rollers 38 are disposed between the drive housing 54 and the idle housing 56. The drive housing 54 includes the gear train 50 for driving the tug rollers 38. The gear train 50 is configured such that the tug rollers 38 all turn at the same speed, and turn with a surface speed equal to the negative surface speed of the segmented drive tracks 46 (FIG. 3). A first pivot mount 58 is provided adjacent the drive housing 54, and a second pivot mount 60 is provided adjacent the idle housing 56. A center pivot 62, preferably attached to the first pivot mount 58, enables the entire skid cradle 42 to pivot, thereby lowering the front facing tug rollers 38 for the helicopter skid 200 loading process. A cradle roller reduction gear 64 is provided for driving the gear train 50, to power all the tug roller 38 on the skid cradle 42.

Referring to FIG. 5, the tug rollers 38 are powered by a series of gear boxes that connect to a main motor/gearbox assembly 66. The main motor/gearbox assembly 66 comprises motors 68 that are connected to a reduction gearbox 70 that outputs directly to the segmented track drive shaft 72. The segmented track driveshaft 72 includes sprockets 74 that provide power to the segmented drive track 46 (FIG. 3) in order to move the helicopter tug 10. A cradle drive gearbox 76 transfers power from the segmented track driveshaft 72 to a cradle slip clutch 78. The cradle slip clutch 78 allows transferred power from the cradle drive gearbox 76 to slip if the tug rollers 38 of the skid cradle 42 are unable to turn due to the helicopter skid 200 being unable to move on the skid cradle 42. This prevents over-torquing the total gearbox train from the main motor/gearbox assembly 66 to the tug rollers 38. The cradle slip clutch 78 is set to rotate freely when the torque exceeds an unsafe predetermined level.

A roller engagement clutch 80 comprises a switchable gearbox that can be engaged to provide power to the tug rollers 38 of the skid cradle 42, or can be disengaged and simultaneously locked to keep the tug rollers 38 from rotating. When the roller engagement clutch 80 is engaged, it rotates the tug rollers 38 to facilitate loading and unloading of the helicopter skid 200 on the helicopter tug 10. When the roller engagement clutch 80 is disengaged and locked, it holds the helicopter skid 200 in a stationary position on the helicopter tug 10 while the helicopter tug 10 is in motion.

Figure 6:
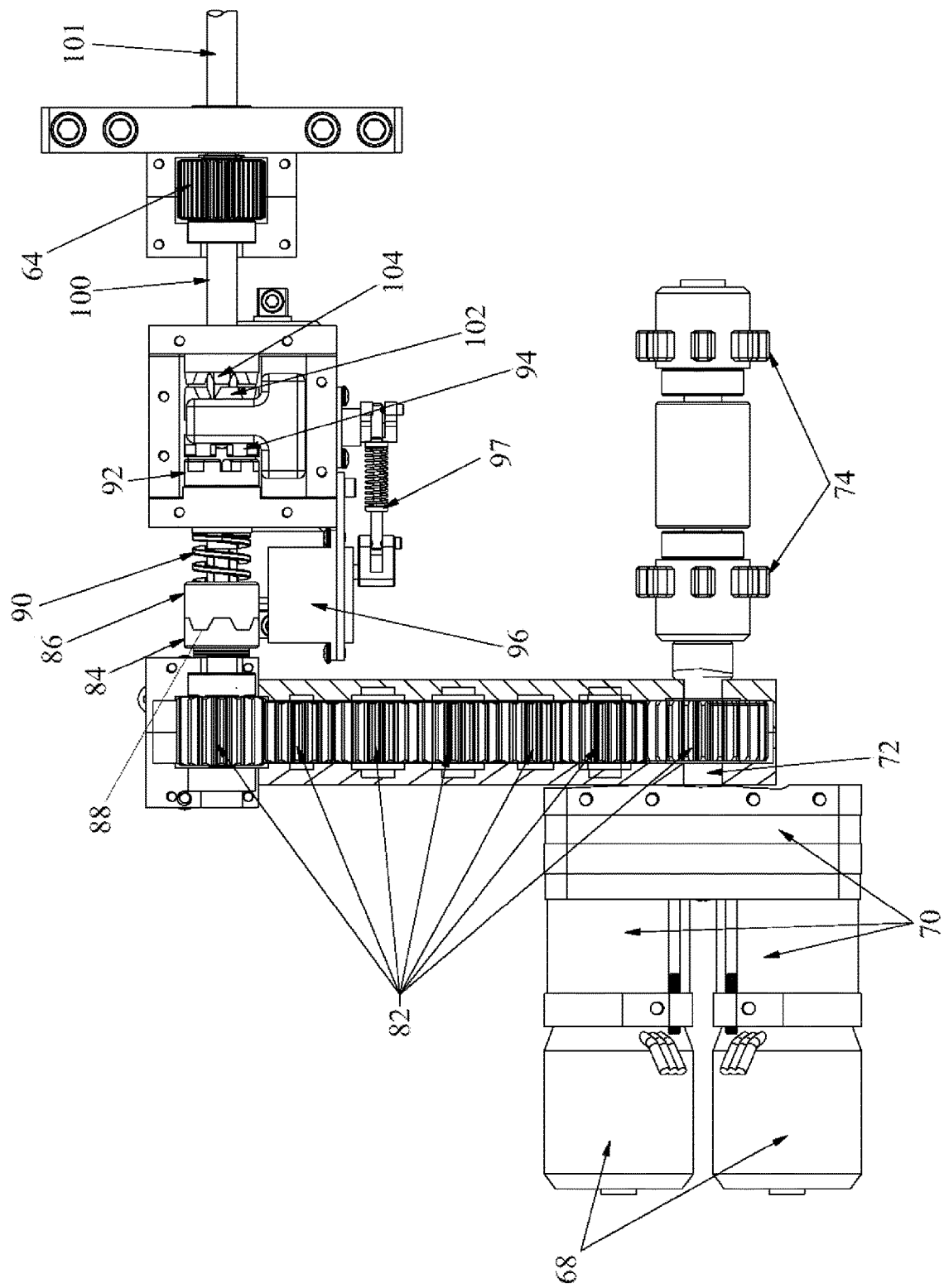
FIG. 6 illustrates a top plan view of a roller engagement clutch and drive train components of the helicopter tug apparatus.

Referring to FIG. 6, an illustration of the helicopter tug 10 drive train components is shown in more detail. The motors 68 and reduction gearboxes 70 of the main motor/gearbox assembly 66 provide high torque output to the segmented track driveshaft 72. The sprockets 74 are connected to, and driven directly from the segmented track driveshaft 72. A cradle drive gear train 82 in the cradle drive gearbox 76 (FIG. 5) transfers power from the segmented track driveshaft 72 to a first slip clutch couple 84. The first slip clutch couple rotates continually as the segmented track driveshaft 72 rotates. A second slip clutch couple 86 is engaged with the first slip clutch couple 84 with angled teeth 88 to transfer power from the first slip clutch couple 84 to the second slip clutch couple 86. A slip clutch spring 90 provides force on the second slip clutch couple 86 to keep it engaged with the first slip clutch couple 84.

When a difference in rotation between the second slip clutch couple 86 and the first slip clutch couple 84 occurs, the slip clutch spring 90 will compress, allowing the second slip clutch couple 86 to disengage from the first slip clutch couple 84. This is a safety mechanism to reduce unwanted torque on the complete drivetrain if there is a difference in rotation anywhere along the complete drive train.

When the second slip clutch couple 86 is rotating, it rotates a roller power couple 92. A drive side roller engagement couple 94 can be engaged with the roller power couple 92 by activating a switching servo motor 96, which moves the drive side roller engagement couple 94 to an engaged position. When the drive side roller engagement couple 94 is engaged to the roller power couple 92, it transfers power to a clutch output shaft 100. The clutch output shaft 100 transfers power to the cradle roller reduction gear 64 which transfers power to a cradle roller drive shaft 101. This arrangement is the loading and unloading condition of the helicopter tug 10 when the tug rollers are being rotated at a synchronized output speed with the helicopter tug's 10 movement.

When the drive side roller engagement couple 94 is disengaged from the roller power couple 92 by the switching servo motor 96 and a switching linkage 97, the roller power couple 92 is able to rotate freely. By disengaging the drive side roller engagement couple 94, a brake side roller engagement couple 102 becomes engaged to a brake couple 104. The brake couple 104 is a rigid mounted connection that does not rotate. When the brake side roller engagement couple 102 is engaged with the brake couple 104 it stops rotation to the clutch output shaft 100, which stops rotation of the tug rollers 38 of the skid cradle 42. This is a locked cradle position that keeps the helicopter skid 200 from moving when the helicopter tug 10 is in motion, such as during transport, after loading, and before unloading.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A helicopter tug for loading, transporting, and unloading a helicopter having a landing skid, the helicopter tug comprising:
    a plurality of loading units arranged to support the landing skid;
    each of the plurality of loading units comprising a skid cradle with a plurality of tug rollers configured to engage the landing skid, a drive track, and at least one motor for operating the skid cradle and the drive track;
    wherein the rollers are reverse synchronized with the drive track, such that when the drive track moves the loading unit under the landing skid, the tug rollers turn in reverse to avoid placing lateral force on the landing skid.

2. The helicopter tug of claim 1, wherein the skid cradle further comprises a pivot, the pivot configured such that the tug rollers are slanted to engage the landing skid at ground level.

3. The helicopter tug of claim 1, wherein the tug rollers comprise non-slip outer surfaces to securely engage the landing skid and prevent it from sliding relative to the loading unit.

4. The helicopter tug of claim 1, wherein the tug rollers are configured to simultaneously provide multiple points of contact with the landing skid during loading, transport, and unloading of the helicopter.

5. The helicopter tug of claim 1, wherein at least two of the loading units are connected by adjustable separation bars to accommodate a variety of widths of landing skids.

6. The helicopter tug of claim 1, wherein each of the plurality of loading units includes alignment rollers configured to confine the landing skid over the tug rollers.

7. The helicopter tug of claim 1, wherein each of the plurality of loading units further comprise fixed wheels adjacent the skid cradle, opposite the drive track, the fixed wheels rotating along the same axis as the drive track.

8. The helicopter tug of claim 1, further comprising a slip clutch between the drive track and the tug rollers, configured to alleviate torsional pressure between them.

9. The helicopter tug of claim 1, further comprising a roller engagement clutch, switchable between a loading/unloading mode, in which the tug rollers are allowed to rotate, and a locked mode, in which the tug rollers are prevented from rotating.

10. The helicopter tug of claim 9, wherein the roller engagement clutch is operated by a remote controlled servo motor.

11. A helicopter tug for loading, transporting, and unloading a helicopter having a landing skid, the helicopter tug comprising:
    two loading units connected by a first separation bar such that the landing skid may rest on both loading units;
    two caster units separated from the loading units by caster connection bars, the caster units connected by a second separation bar;
    each of the loading units comprises a skid cradle with a plurality of tug rollers configured to engage the landing skid, a drive track, and at least one motor for operating the skid cradle and the drive track;
    wherein the rollers are reverse synchronized with the drive track, such that when the drive track moves the loading unit under the landing skid, the tug rollers turn in reverse to avoid placing lateral force on the landing skid.

12. The helicopter tug of claim 11, wherein the skid cradle further comprises a pivot, the pivot configured such that the tug rollers are slanted to engage the landing skid at ground level.

13. The helicopter tug of claim 11, wherein the tug rollers comprise non-slip outer surfaces to securely engage the landing skid and prevent it from sliding relative to the loading unit.

14. The helicopter tug of claim 11, wherein the tug rollers are configured to simultaneously provide multiple points of contact with the landing skid during loading, transport, and unloading of the helicopter.

15. The helicopter tug of claim 11, wherein first separation bar and the second separation bar are adjustable to accommodate a variety of widths of landing skids.

16. The helicopter tug of claim 11, wherein each of the plurality of loading units includes alignment rollers configured to confine the landing skid over the tug rollers.

17. The helicopter tug of claim 11, wherein each of the plurality of loading units further comprise fixed wheels adjacent the skid cradle, opposite the drive track, the fixed wheels rotating along the same axis as the drive track.

18. The helicopter tug of claim 11, further comprising a slip clutch between the drive track and the tug rollers, configured to alleviate torsional pressure between them.

19. The helicopter tug of claim 11, further comprising a roller engagement clutch, switchable between a loading/unloading mode, in which the tug rollers are allowed to rotate, and a locked mode, in which the tug rollers are prevented from rotating.

20. The helicopter tug of claim 19, wherein the roller engagement clutch is operated by a remote controlled servo motor.

* * * * *